US009381533B2

(12) United States Patent
Pellin et al.

(10) Patent No.: US 9,381,533 B2
(45) Date of Patent: Jul. 5, 2016

(54) QUICK ATTACHING FLUID HEAD

(75) Inventors: Christopher J. Pellin, Burnsville, MN (US); Joseph E. Tix, Hastings, MN (US); Mark T Weinberger, Mounds View, MN (US)

(73) Assignee: Graco Minnesota Inc., Minneapolis, MN (US)

( * ) Notice: Subject to any disclaimer, the term of this patent is extended or adjusted under 35 U.S.C. 154(b) by 444 days.

(21) Appl. No.: 12/992,461

(22) PCT Filed: May 14, 2009

(86) PCT No.: PCT/US2009/043917

§ 371 (c)(1), (2), (4) Date: Nov. 12, 2010

(87) PCT Pub. No.: WO2009/140472

PCT Pub. Date: Nov. 19, 2009

(65) Prior Publication Data

US 2011/0073680 A1 Mar. 31, 2011

Related U.S. Application Data

(60) Provisional application No. 61/053,430, filed on May 15, 2008.

(51) Int. Cl.
*B05B 7/02* (2006.01)
*B05B 7/12* (2006.01)
(Continued)

(52) U.S. Cl.
CPC . *B05B 15/00* (2013.01); *B05B 7/02* (2013.01); *B05B 7/0815* (2013.01); *B05B 9/01* (2013.01); *B05B 7/0408* (2013.01); *B05B 7/0416* (2013.01); *B05B 15/02* (2013.01)

(58) Field of Classification Search
CPC .......... B05B 7/0815; B05B 7/02; B05B 9/01; F16L 37/091; F16L 37/248; F16L 37/252
USPC ............ 239/525, 526, 600; 222/145.5, 145.7, 222/145.2, 135
See application file for complete search history.

(56) References Cited

U.S. PATENT DOCUMENTS 2,780,496 A 2/1957 Asbeck et al.
3,162,470 A * 12/1964 Owens et al. .................. 285/86
(Continued)

FOREIGN PATENT DOCUMENTS

CN 1705518 A 12/2005
DE 102004040084 A1 * 2/2006
(Continued)

OTHER PUBLICATIONS

Graco Inc. Fusion Gun manual, see especially "repair" section, pp. 27-30 for former design.
(Continued)

*Primary Examiner* — Len Tran
*Assistant Examiner* — Alexander Valvis
(74) *Attorney, Agent, or Firm* — Kinney & Lange, P.A.

(57) ABSTRACT

The fluid section or head (10) for a plural component applicator can be easily assembled or removed from the air section (12) by turning the fluid head ⅛ of a turn. The fluid head (10) has four tabs (14) that protrude and engage with four undercut features (16) within the handle (12). Tabs (14) are inserted through corresponding openings (16) in the front (12a) of air section (12) and rotated such that tabs (14) are retained behind lips (18). A locking tab feature (20) in the hose manifold (24) mates to a recess feature (22) in the handle (12) to prevent the fluid section (10) from rotating.

2 Claims, 4 Drawing Sheets

(51) Int. Cl.

| | |
|---|---|
| ***B05B 7/24*** | (2006.01) |
| ***B05B 15/02*** | (2006.01) |
| ***F16L 35/00*** | (2006.01) |
| ***F16L 37/00*** | (2006.01) |
| ***B05B 15/00*** | (2006.01) |
| ***B05B 7/08*** | (2006.01) |
| ***B05B 9/01*** | (2006.01) |
| *B05B 7/04* | (2006.01) |

(56) References Cited

U.S. PATENT DOCUMENTS

| | | | | | |
|---|---|---|---|---|---|
| 3,633,828 | A | * | 1/1972 | Larson | 239/412 |
| 4,005,824 | A | * | 2/1977 | Becker et al. | 239/289 |
| 4,253,683 | A | * | 3/1981 | Jentsch et al. | 285/13 |
| 4,552,425 | A | * | 11/1985 | Billman | 439/295 |
| 4,760,956 | A | | 8/1988 | Mansfield | |
| 4,863,104 | A | | 9/1989 | Masterson | |
| 4,925,101 | A | | 5/1990 | Konieczynski et al. | |
| 5,071,069 | A | * | 12/1991 | Stirm | 239/128 |
| 5,299,740 | A | | 4/1994 | Bert | |
| 5,487,507 | A | * | 1/1996 | McDonald et al. | 239/391 |
| 5,609,302 | A | | 3/1997 | Smith | |
| 5,829,680 | A | | 11/1998 | Perret, Jr. | |
| 6,264,113 | B1 | | 7/2001 | Dingler | |
| 6,349,884 | B1 | | 2/2002 | Thome et al. | |
| 6,698,622 | B2 | * | 3/2004 | Sawhney et al. | 222/137 |
| 6,874,702 | B2 | | 4/2005 | Turnbull | |
| 7,059,545 | B2 | | 6/2006 | Reetz, III | |
| 7,234,649 | B2 | | 6/2007 | Robinson | |
| 7,306,171 | B2 | * | 12/2007 | Weinberger et al. | 239/398 |
| 7,494,387 | B2 | * | 2/2009 | Ohshima et al. | 439/841 |
| 7,694,893 | B2 | | 4/2010 | Zittel et al. | |
| 8,276,609 | B2 | | 10/2012 | Frey | |
| 2005/0218246 | A1 | * | 10/2005 | Chatron et al. | 239/290 |
| 2007/0034716 | A1 | * | 2/2007 | Zittel et al. | 239/296 |
| 2007/0164129 | A1 | | 7/2007 | Doner et al. | |
| 2007/0210184 | A1 | * | 9/2007 | Vacher | 239/279 |
| 2008/0252073 | A1 | * | 10/2008 | Frey | 285/330 |
| 2011/0095104 | A1 | * | 4/2011 | Swan | 239/589 |

FOREIGN PATENT DOCUMENTS

| | | | |
|---|---|---|---|
| DE | 102004040084 | A1 | 5/2007 |
| EP | 0997200 | | 3/2004 |
| JP | 2000153185 | A | 6/2000 |
| WO | 2004037429 | A2 | 5/2004 |

OTHER PUBLICATIONS

International Search Report, International Application No. PCT/US03/33422, dated Apr. 14, 2004, 1 page.

The State Intellectual Property Office of the People's Republic of China, First Office Action, CN Application No. 200980117633.8, dated Oct. 15, 2012, 11 pages.

Australian Patent Examination Report No. 1, AU Application No. 2009246276, dated Oct. 11, 2013, 3 pages.

Extended European Search Report, EP Application No. 097475545—1760/2285496, dated Jan. 7, 2014, 5 page.

English Translation of Taiwan Office Action, TW Application No. 098115151, dated Feb. 13, 2014, 4 pages.

English Translation of Taiwan Office Action, TW Application No. 098115151, dated Aug. 28, 2014, 3 pages.

English Translation of Korean Office Action, KR Application No. 10-2010-7028032, dated Feb. 15, 2015, 3 pages.

* cited by examiner

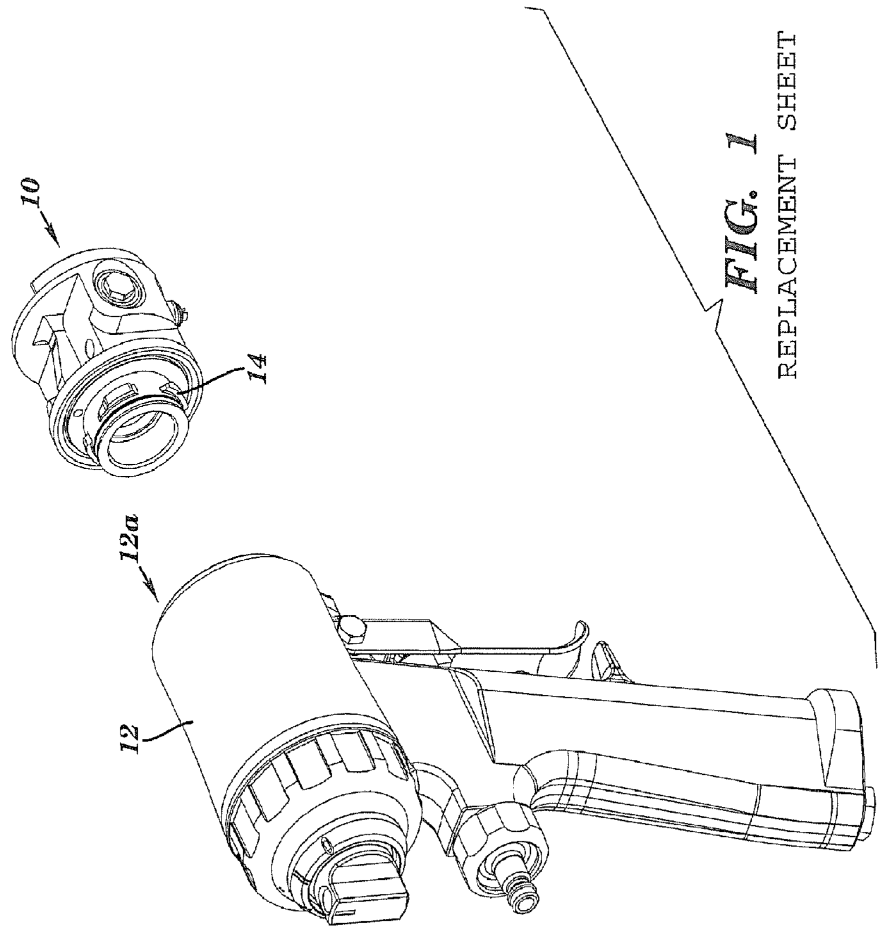
FIG. 1
REPLACEMENT SHEET

QUICK ATTACHING FLUID HEAD

This application claims the benefit of U.S. Application Ser. No. 61/053,430 filed May 15, 2008, the contents of which are hereby incorporated by reference.

TECHNICAL FIELD

Background Art

Spray guns for application of fast setting materials such as polyurethanes and polyureas are well known. Because these materials set up so fast, it is important that the gun or applicator be easily disassembled with a minimum of tools for cleaning.

DISCLOSURE OF THE INVENTION

An object of this invention is to develop a simple method of attaching the high-pressure fluid section to lower pressure air section (handle). The fluid section can be easily assembled/removed from the air section by turning the fluid head ⅛ of a turn. The fluid head has four tabs that protrude and engage with four undercut features within the handle. Machined features in the air section (handle) prevent the fluid head from over rotating during assembly/removal by limiting rotation to ⅛ of a turn. When fully assembled, a locking tab feature in the hose manifold mates to a recess feature in the handle to prevent the fluid section from rotating. This construction uses fewer parts and is easy to assemble and remove.

These and other objects and advantages of the invention will appear more fully from the following description made in conjunction with the accompanying drawings wherein like reference characters refer to the same or similar parts throughout the several views.

BRIEF DESCRIPTION OF DRAWINGS

FIG. 1 shows an exploded view of the fluid head relative to the air section.

BEST MODE FOR CARRYING OUT THE INVENTION

Figure 2:
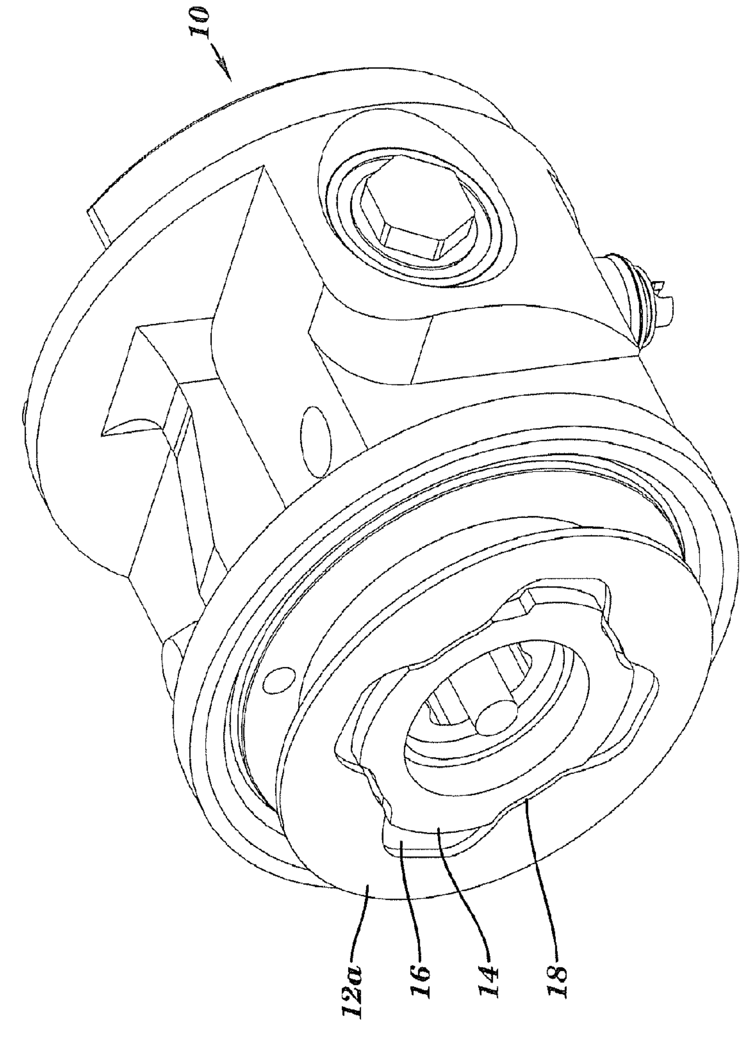
FIG. 2 shows the fluid head during the first stage of assembly to a portion of the air section.
Figure 3:
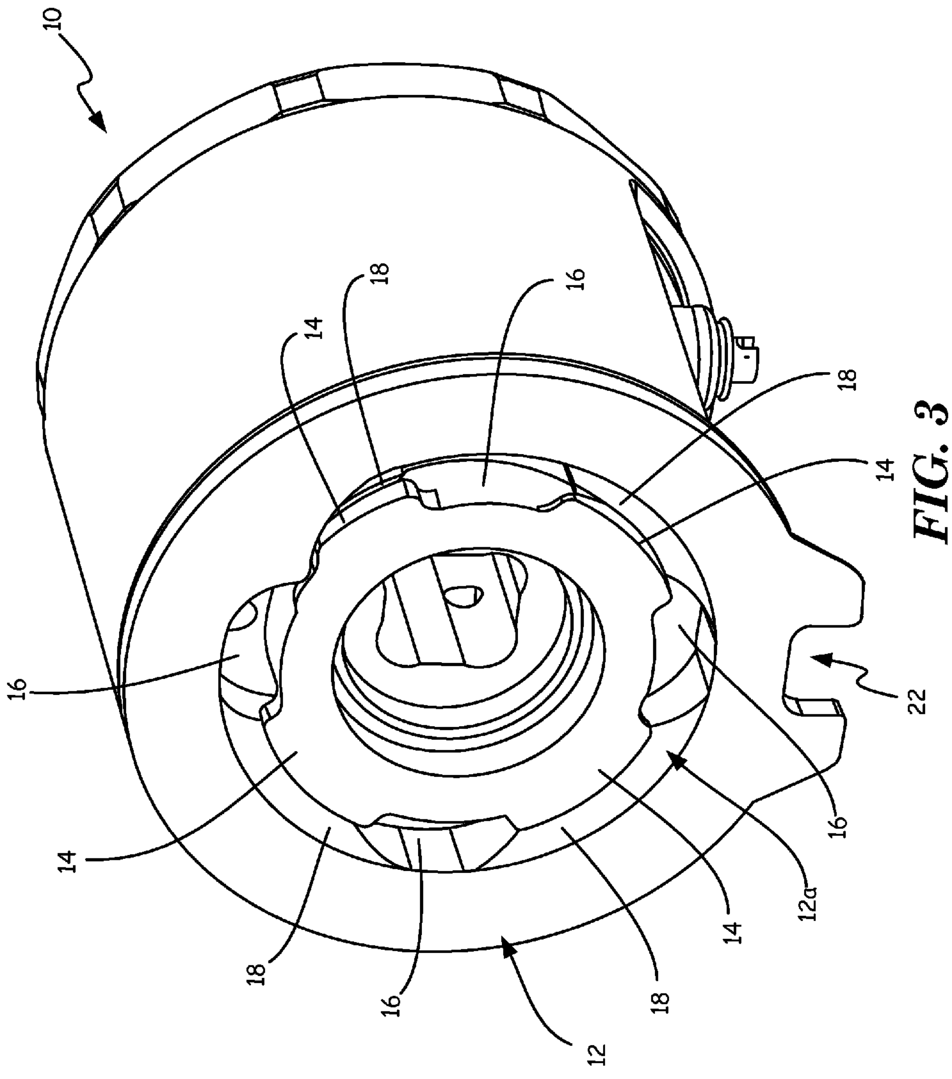
FIG. 3 shows the fluid head during the next stage of assembly to a portion of the air section.

The fluid section or head 10 of the instant invention can be easily assembled or removed from the handle/air section 12 by turning the fluid head ⅛ of a turn. The fluid head 10 has four tabs 14 that protrude and engage with four undercut features 16 within the handle 12 (see FIG. 1). FIG. 2 shows tabs 14 being inserted through corresponding openings 16 in the front 12*a* of air section 12 while FIG. 3 shows air section 12 having been rotated such that tabs 14 are retained behind lips 18. Machined features in the air section (handle) 12 prevent the fluid head 10 from over rotating during assembly or removal limiting rotation to ⅛ of a turn.

Figure 4:
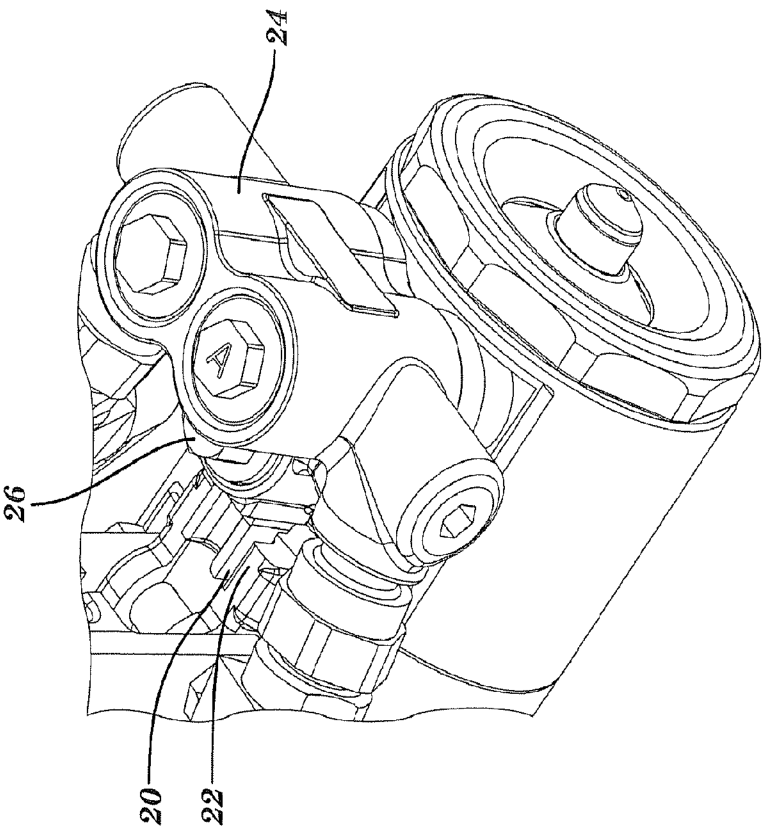
FIG. 4 shows the fluid head assembled to the air section with the hose manifold.

To finish assembly, a locking tab feature 20 in the hose manifold 24 mates to a recess feature 22 in the handle 12 to prevent the fluid section 10 from rotating (see FIG. 4). The hose manifold 24 is secured to fluid section 12 by means of a bolt or other known fastener 26. Once this is tightened, the manifold 24, fluid section 10 and handle 12 are all fixed relative to each other. Disassembly is, of course, the opposite of assembly. Bolt 26 is removed which allows hose manifold to be removed from the fluid section 10. This in turn allows fluid section 10 to be rotated ⅛ of a turn and separated from the handle.

It is contemplated that various changes and modifications may be made to the quick attaching fluid head without departing from the spirit and scope of the invention as defined by the following claims.

The invention claimed is:

1. An assembly for connection to a handle of a fast set plural component spray gun, wherein the handle includes an air section having a front end with radially outward extending notch openings separated by a plurality of radially inward extending lips, and wherein the front end of the handle includes a pair of radially outward protrusions that define a radial slot recess in a periphery of the front end of the handle, the assembly comprising:

a fluid head having a rear end comprising a plurality of circumferentially spaced radially outward extending tabs that are shaped to be inserted through the notch openings in the front end of the handle so that the tabs when rotated are aligned with and retained within the handle behind the lips to connect the fluid head to the air section of the handle; and a hose manifold configured to mate with the fluid head, and comprising a locking tab at a rear end of the hose manifold which extends into and mates to the radial slot recess in the periphery of the front end of the handle when the fluid head is attached to the handle and the hose manifold is positioned in engagement with the fluid head, and wherein the locking tab and the radial slot recess are configured to prevent the fluid head from rotating with respect to the handle when the hose manifold is secured to the fluid head by a fastener, so that the hose manifold, fluid head and handle are all fixed relative to one another and cannot be disassembled without removal of the fastener to allow removal of the hose manifold from the fluid head and disengagement of the locking tab at the rear end of the hose manifold from the slot recess in the front end of the handle, followed by rotation of the fluid head to allow separation of the fluid head from the handle.

2. A spray gun comprising:

a handle section which includes an air section having a front end, the handle section includes an opening including a plurality of radially outward extending notches circumferentially separated by radially inward extending lips and that includes a pair of radially outward protrusions that define a radial slot recess in a periphery of the front end of the air section;

a fluid head section having a rear end for mating with the front end of the handle section, the rear end of the fluid section including a plurality of circumferentially separated tabs that are shaped to be inserted through the notches and then rotated to be aligned with and retained by the lips to connect the fluid section to the handle section;

a hose manifold mated to the fluid section, the hose manifold including a locking tab at a rear end of the hose manifold that extends into and mates with the radial slot recess in the periphery of the front end of the handle section when the fluid head is attached to the handle and the hose manifold is positioned in engagement with the fluid head, and wherein the locking tab and the radial slot recess are configured to prevent rotation of the fluid section and the hose manifold with respect to the handle section when the hose manifold is secured to the fluid section; and a fastener for securing the hose manifold to the fluid section, so that the hose manifold, the fluid section, and the handle section are all fixed relative to one another and cannot be disassembled without removal of the fastener to allow removal of the hose manifold from the fluid section and disengagement of the locking tab at the rear end of the hose manifold from the slot recess in the front end of the handle, followed by rotation of the fluid section to allow separation of the fluid section from the handle section.

* * * * *